United States Patent
Niewohner

(10) Patent No.: US 7,681,534 B1
(45) Date of Patent: Mar. 23, 2010

(54) VEHICLE MOUNTED GATE

(76) Inventor: Steven L. Niewohner, 309 Plantation St., Elgin, NE (US) 68636

( * ) Notice: Subject to any disclaimer, the term of this patent is extended or adjusted under 35 U.S.C. 154(b) by 491 days.

(21) Appl. No.: 11/705,353

(22) Filed: Feb. 12, 2007

(51) Int. Cl.
*A01K 1/00* (2006.01)
(52) U.S. Cl. ............................ 119/512
(58) Field of Classification Search .............. 119/453, 119/516, 524, 512, 514, 519, 502, 732; 414/703
See application file for complete search history.

(56) References Cited

U.S. PATENT DOCUMENTS

| | | | | |
|---|---|---|---|---|
| 4,201,157 A | * | 5/1980 | Lambert | 119/752 |
| 4,944,354 A | * | 7/1990 | Langen et al. | 172/47 |
| 5,237,960 A | * | 8/1993 | Wilson | 119/514 |
| 6,067,940 A | * | 5/2000 | Holder | 119/512 |
| 7,389,746 B2 | * | 6/2008 | Byl et al. | 119/512 |
| 7,461,702 B2 | * | 12/2008 | Farnsworth et al. | 172/439 |

* cited by examiner

*Primary Examiner*—Charles A Fox
(74) *Attorney, Agent, or Firm*—Dennis L. Thomte; Thomte Patent Law Office LLC

(57) ABSTRACT

A gate is operatively secured to the three-point hitch of a vehicle such as a tractor or the like and is movable between a forwardly extending transport position at one side of the vehicle, a substantially vertically disposed second position, and a third rearwardly extending position to close an opening in a fence or the like. The gate may be moved by an electrical motor/gearbox or a hydraulic motor/gearbox and is radio controllable.

13 Claims, 8 Drawing Sheets

VEHICLE MOUNTED GATE

BACKGROUND OF THE INVENTION

1. Field of the Invention

This invention relates to a vehicle mounted gate and more particularly to a gate which is mounted at the rearward end of a tractor with the gate being pivotally moved with respect to the tractor so that the gate may be lowered into position to close an opening in a fence line, alleyway, etc.

2. Description of the Related Art

In large cattle feedlots, the cattle are usually separated into large pens or holding areas having swinging gates positioned therebetween. Further, alleyways are sometimes provided between the pens with those alleyways being closed either at one end or both ends by swinging gates. When it is time to clean out the pens, an operator of a piece of equipment is required to drive through the closed gate every few minutes. This requires the operator to stop the equipment or vehicle to open and close the gate, or have someone stand and watch the gate while the equipment is going through the gate.

SUMMARY OF THE INVENTION

A vehicle mounted gate is disclosed wherein the vehicle has a forward end, a rearward end, a right side and a left side. The vehicle includes a hydraulic power means and an electrical power means together with a multiple-point hitch which is selectively vertically movable at the rearward end thereof. A first horizontally disposed frame member, having a first and a second end, is secured to the multiple-point hitch for vertical movement therewith. A second horizontally disposed frame member, having first and second ends, is pivotally secured at its first end, about a vertical axis, to the rearward end of the first frame member intermediate the length thereof. The second frame member is selectively pivotally movable between first and second positions with respect to the first frame member. The second frame member extends from its pivotal connection with the first frame member, when in its first position, towards and outwardly of the right side of the vehicle and is disposed parallel to the first frame member. The second frame member extends from its pivotal connection with the first frame member, when in its second position, towards and outwardly of the left side of the vehicle and is disposed parallel to the first frame member.

A gearbox is secured to the second end of the second frame member and has a rotatable drive shaft extending therefrom which is driven by a reversible hydraulic motor operatively connected to the vehicle hydraulic power means and to the gearbox for rotating the drive shaft in opposite directions. The gate member, which is attached to the gearbox at the outer end of the second frame member, has first and second ends and first and second sides. The drive shaft of the gearbox is operatively secured to the gate member at one side thereof adjacent the first end thereof. The gate member is selectively pivotally movable, with respect to the second frame member, between first, intermediate and second positions. The gate member, when in its first position, and the second frame member is in its first position, extends substantially horizontally and forwardly from the second frame member at the right side of the vehicle. The gate member, when in its intermediate position and the second frame member is in its first position, extends substantially vertically upwardly from the second frame member. The gate member, when in its second position and the second frame member is in its first position, extends substantially horizontally and rearwardly from the second frame member at the right side of the vehicle.

The gate member, when in its first position and the second frame member is in its second position, extends substantially horizontally and forwardly from the second frame member at the left side of the vehicle. The gate member, when in its intermediate position and the second frame member is in its second position, extends substantially vertically upwardly from the second frame member. The gate member, when in its second position and the second frame member is in its second position, extends substantially horizontally and rearwardly from the second frame member at the left side of the vehicle.

The hydraulic motor is preferably remotely controllable so that an operator may control the operation of the gate from a position remote of the vehicle. Preferably, the gate member comprises an inner gate section and an outer gate section which is pivotally secured thereto so that the outer gate section may be selectively movable between a working position and a transport position relative to the inner gate section.

It is therefore a principal object of the invention to provide a vehicle mounted gate which is remotely controllable.

A further object of the invention is to provide a tractor mounted gate wherein the tractor may be positioned adjacent a gate opening with the gate attached to the tractor being able to be pivotally moved with respect to the tractor to selectively close the gate opening.

A further object of the invention is to provide a tractor mounted gate which relies on a hydraulic motor to move the gate between its open and closed positions and which also includes means for moving the gate to a transport position.

These and other objects will be apparent to those skilled in the art.

DESCRIPTION OF THE PREFERRED EMBODIMENT

Figure 6:
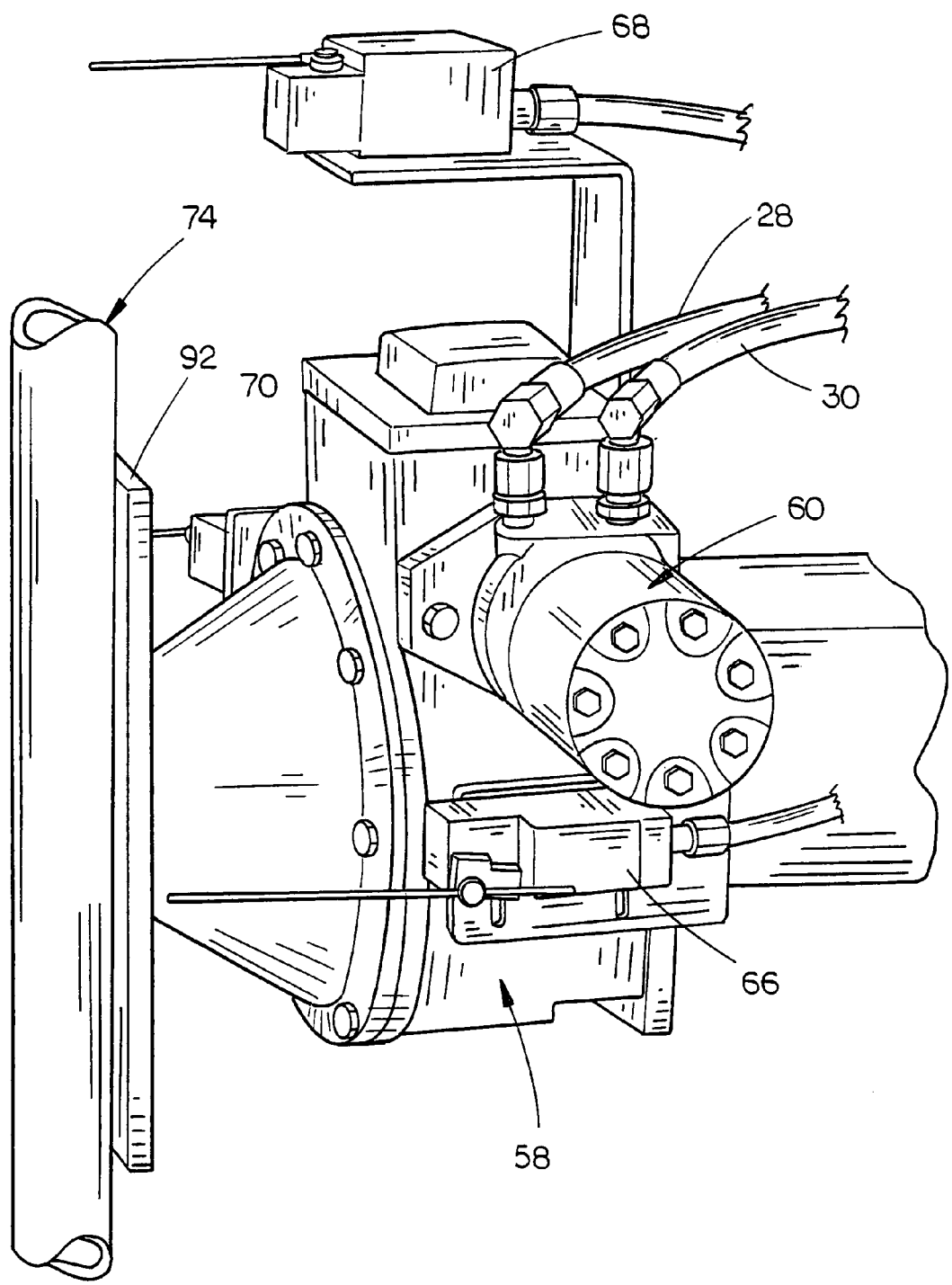
FIG. 6 is a perspective view as seen in an opposite direction from that of FIG. 5.

The numeral 10 refers to a vehicle such as a tractor or the like having a forward end 12, a rearward end 14, a right side 16 and a left side 18. A conventional multiple-point hitch such as a three-point hitch 20 including lower hitch points 22 and 24 and upper hitch point 26 is mounted at the rearward end 14 of the tractor which may be raised and lowered in conventional fashion. The tractor 10 also includes a conventional hydraulic system having a pair of hydraulic hoses 28 and 30 extending therefrom (FIG. 6).

The movable gate assembly of this invention is referred to generally by the reference numeral 32 and is secured to the three-point hitch 20 as will now be described. The numeral 34 refers to a horizontally disposed tubular frame member having hitch members 36, 38 and 40 welded thereto which are selectively removably and pivotally connected to hitch points 22, 24 and 26, respectively, for movement with hitch 20. Frame member 34 has a pair of support legs 42 and 44 welded to the lower side thereof which extend downwardly therefrom for ground engagement when frame member 34 is lowered by the hitch 20. Frame member 34 has a pair of clevis elements 46 and 48 secured to the rearward side thereof at the opposite ends thereof. Each of the clevis elements 46 and 48 include vertically spaced plates, the rearward ends of which are adapted to have a pin extending therethrough as will be described hereinafter. Frame member 34 also has a clevis element 49 secured thereto at the center thereof.

Frame member 34 has a swing frame member 50 pivotally secured thereto about a vertically disposed pivot pin 51. As seen, the frame member 50 may be pivotally moved between a first position wherein it extends to the right side of the tractor 10 and is received between the vertically spaced plates of clevis element 48 (solid lines in FIG. 2) to a second position wherein it extends to the left side of the tractor and is received between the vertically spaced plates of clevis element 46 (broken line position of FIG. 2). Frame member 50 may be secured in either position by extending a pin 54 downwardly through the rearward ends of the clevis elements 46 and 48.

Figure 2:
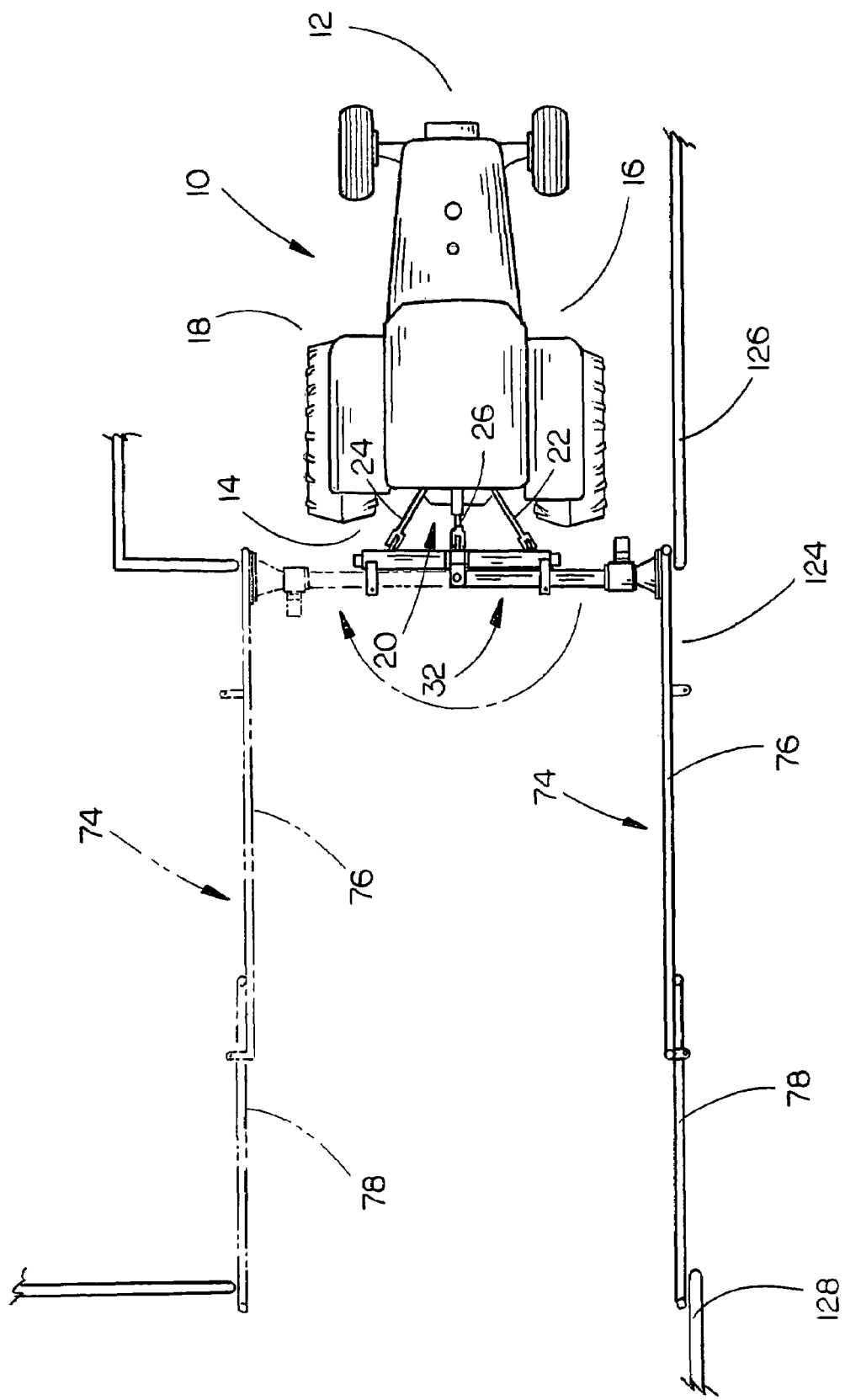
FIG. 2 is a top view of the vehicle mounted gate with the broken lines illustrating an alternate position to which the gate may be moved.
Figure 3:
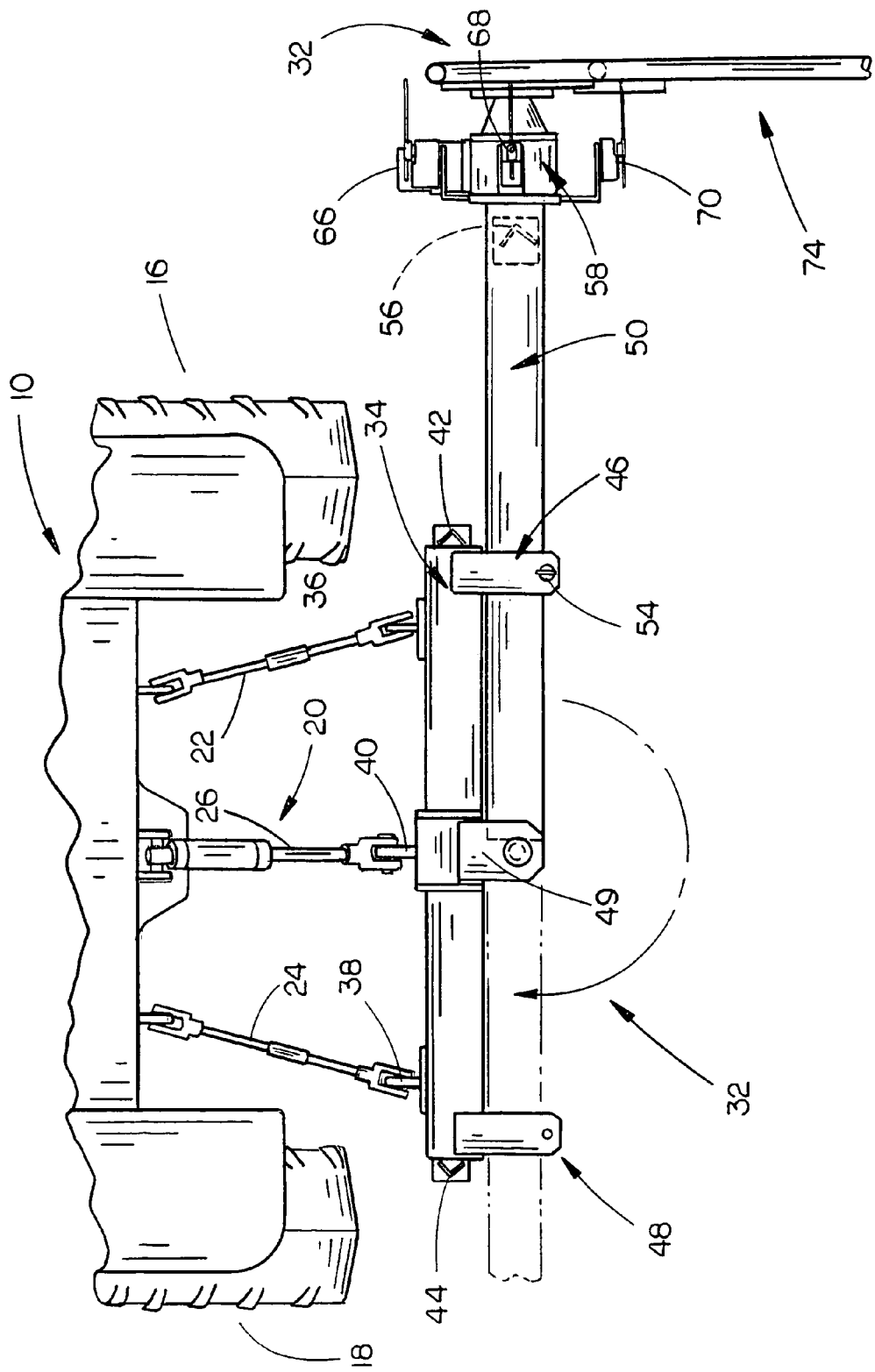
FIG. 3 is a top view illustrating the manner in which the movable gate is attached to a frame member which is vertically movable by the multiple-point hitch of the vehicle.
Figure 7:
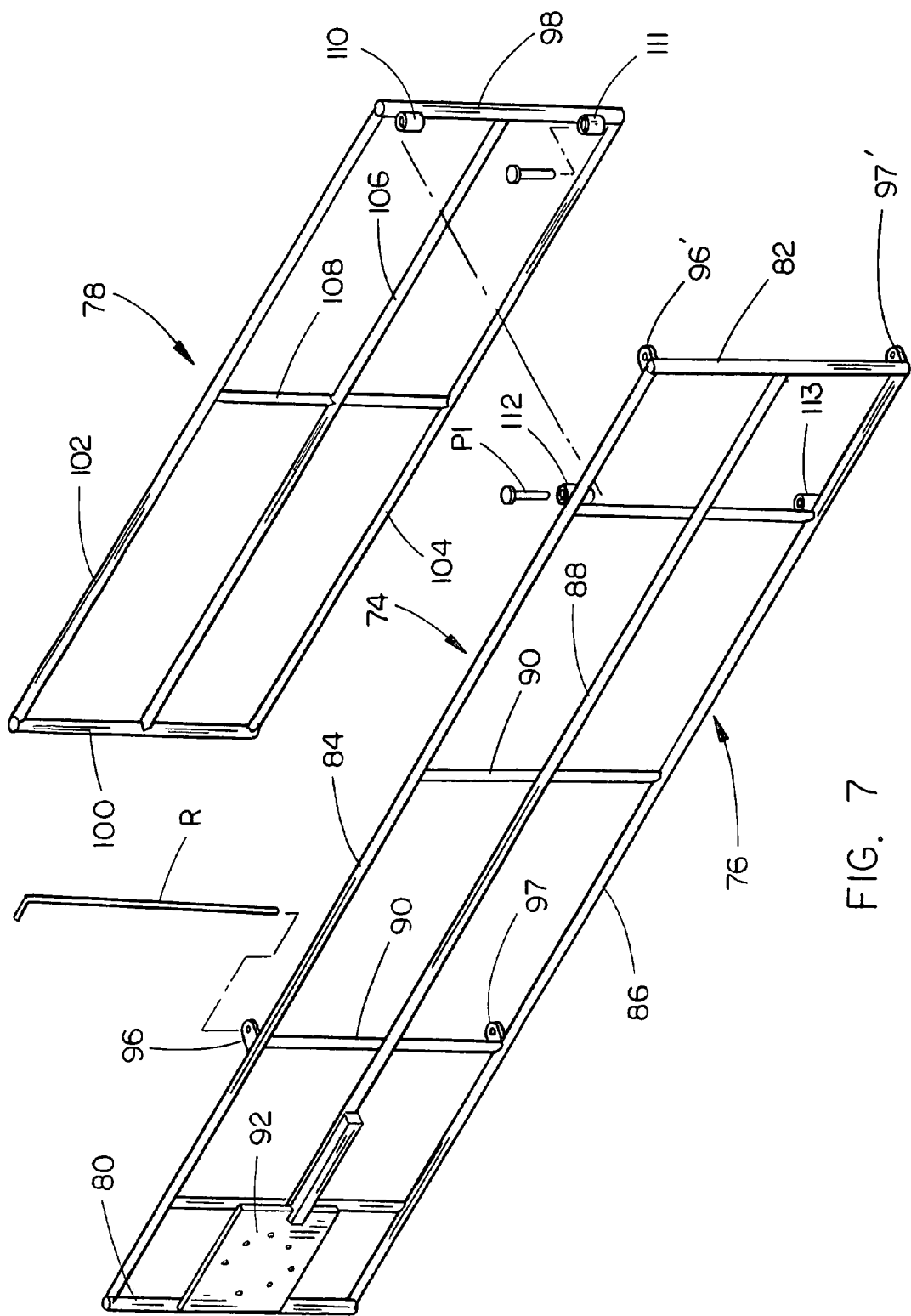
FIG. 7 is an exploded perspective view of the gate member.
Figure 8:
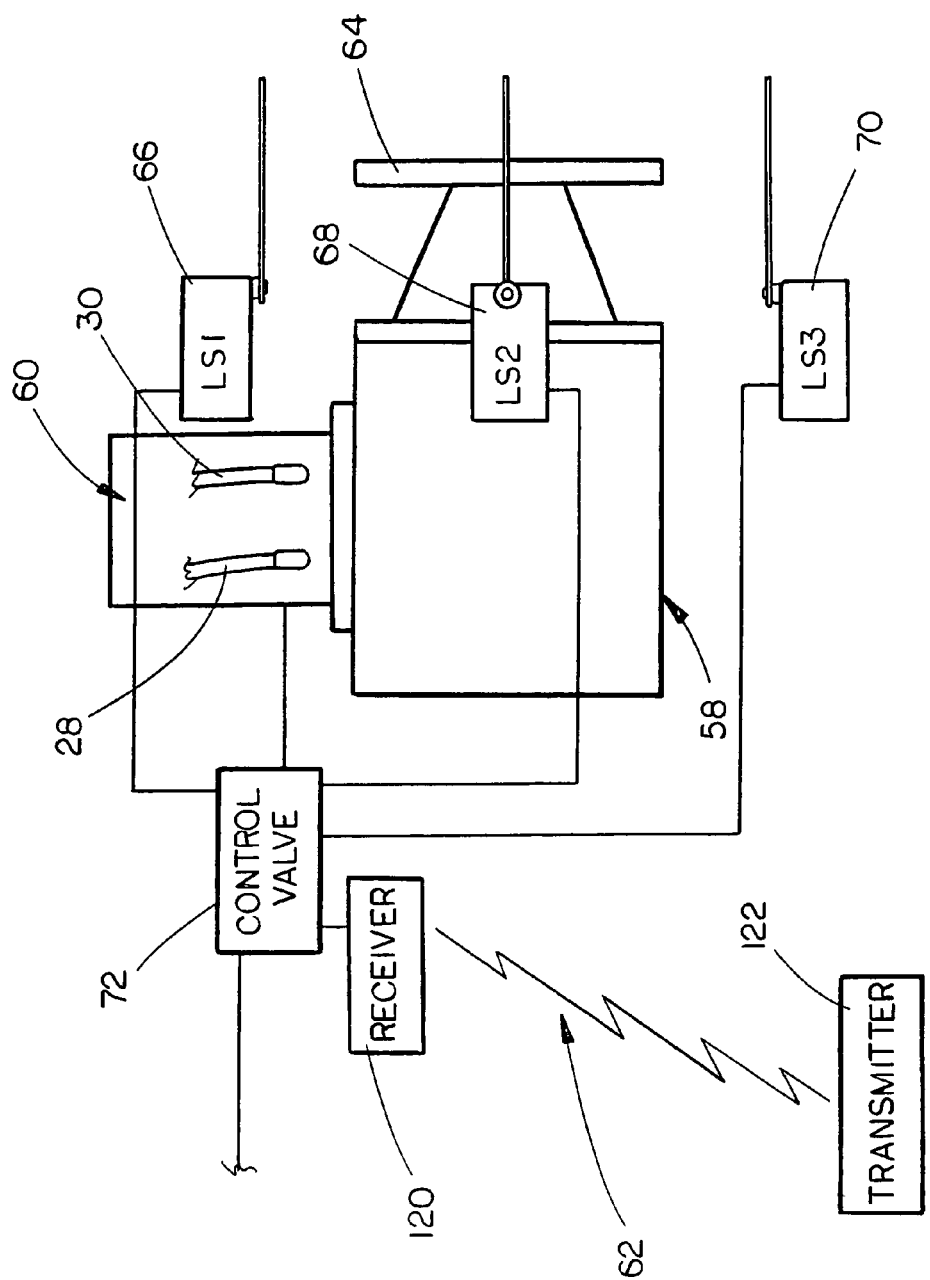
FIG. 8 is a schematic view of the circuitry for controlling the movement of the gate member.

The outer end of frame member 50 has a support leg 56 welded thereto which extends downwardly therefrom for ground engagement when hitch 20 is lowered, as will be described hereinafter. Gearbox 58 is secured to the outer end of frame member 50 and has a rotatable drive shaft extending horizontally therefrom parallel to the longitudinal axis of frame member 50. Gearbox 58 is driven by a hydraulic motor 60 having the hydraulic hoses 28 and 30 connected thereto. Although it is preferred that a hydraulic motor be employed, the gearbox could be driven by an electric motor connected to the tractor electrical system. The hydraulic motor 60 or the gearbox 58 is operated by a conventional radio control referred to generally by the reference numeral 62 which may be either battery powered or powered by the electrical system of the tractor. The outer end of the gearbox shaft has a mounting plate 64 secured thereto. Preferably, the radio control 62 includes limit switches 66, 68 and 70 which will temporarily deactivate the electrical control valve 72 connected to hydraulic motor 60 when the gate member 74 of gate assembly 32 reaches its first, intermediate and second positions as will be explained hereinafter. Gate member 74 is preferably, but not necessarily, comprised of an inner gate section 76 and an outer gate section 78 selectively pivotally or hingedly secured thereto, as seen in FIGS. 2 and 7. Inner gate section 76 includes an inner pipe or post 80, an outer pipe or post 82, a top rail 84 secured to and extending between the upper ends of pipes 80 and 82, a bottom rail 86 secured to and extending between the lower ends of pipes 80 and 82, an intermediate rail 88 secured to and extending between pipes 80 and 82 between rails 84 and 86, and braces 90. Plate 92 is secured to one side of inner gate section 76 which is bolted to the mounting plate 64 on the gearbox drive shaft. Clevises 96 and 97 are secured to top rail 84 and bottom rail 86, respectively, and extend therefrom (FIG. 7) and are adapted to receive a rod R therein.

Outer gate section 78 includes an inner pipe or post 98, an outer pipe or post 100, a top rail 102 secured to and extending between the upper ends of pipes 98 and 100, a bottom rail 104 secured to and extending between the lower ends of pipes 98 and 100, an intermediate rail 106 secured to and extending between pipes 98 and 100 between rails 102 and 104, and brace 108. The collars or sleeves 110 and 111 on outer gate section 78 are pivotally secured to the collars or sleeves 112 and 113 on inner gate section 74 by pins P1 and P2, as seen in FIG. 7. Outer gate section 78 may be folded to a transport position (FIGS. 1 and 7) where it is positioned adjacent inner gate section 76 with top rail 102 of outer gate section 78 being received within clevises 96 and 97 and pinned thereto by rod R to maintain the outer gate section 78 in the transport position when inner gate section 76 is in the transport position at one side of the tractor. Suitable means is provided for maintaining inner gate section 76 in its transport position.

Radio control 62 includes a receiver 120 and associated circuitry for controlling the operation of control valve 72 upon receiving signals from the remote transmitter 122.

Figure 1:
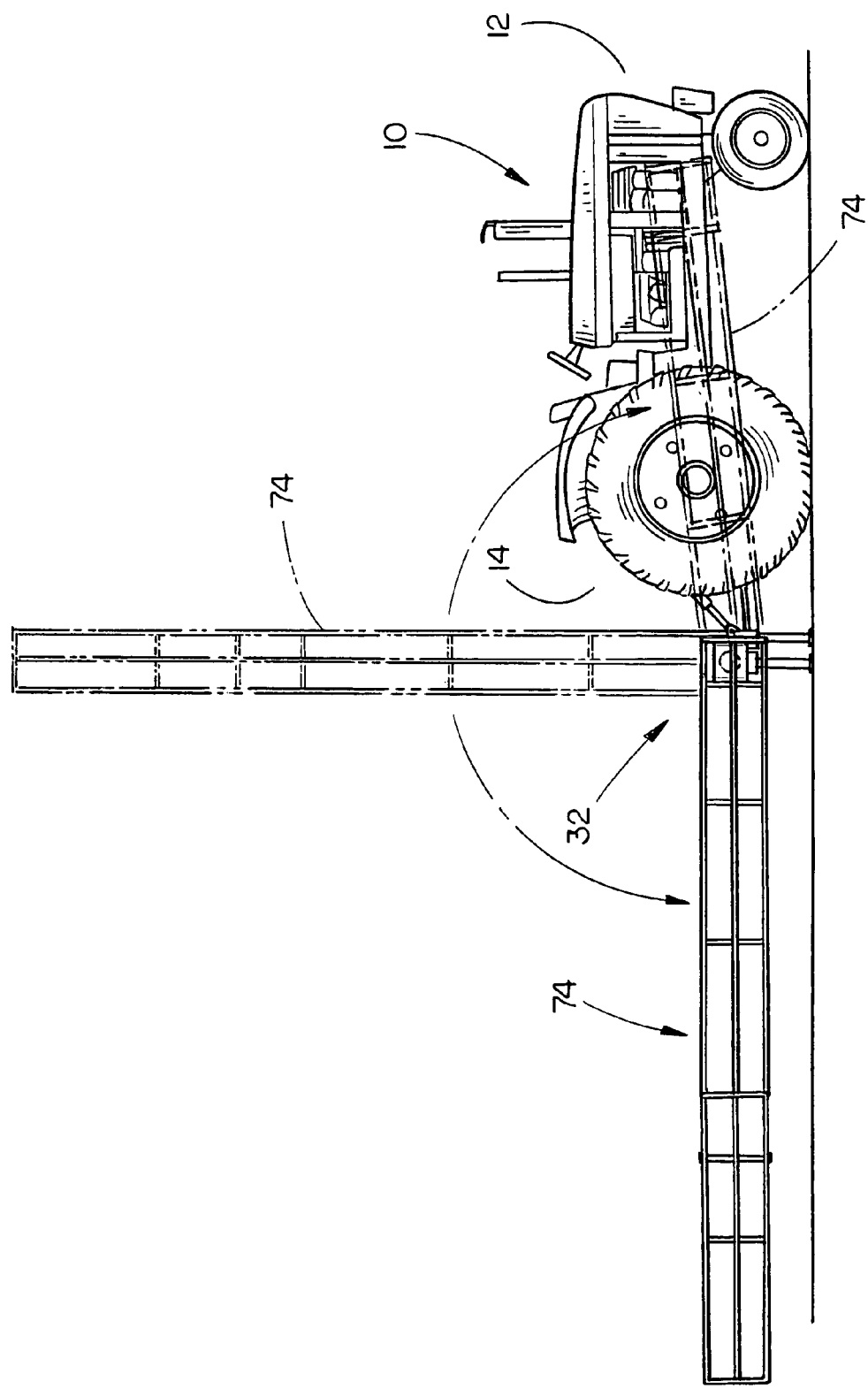
FIG. 1 is a side view of a tractor having the gate mounted at the rearward end thereof with the broken lines indicating an alternate or intermediate position to which the gate may be pivotally moved with respect to the vehicle.
Figure 4:
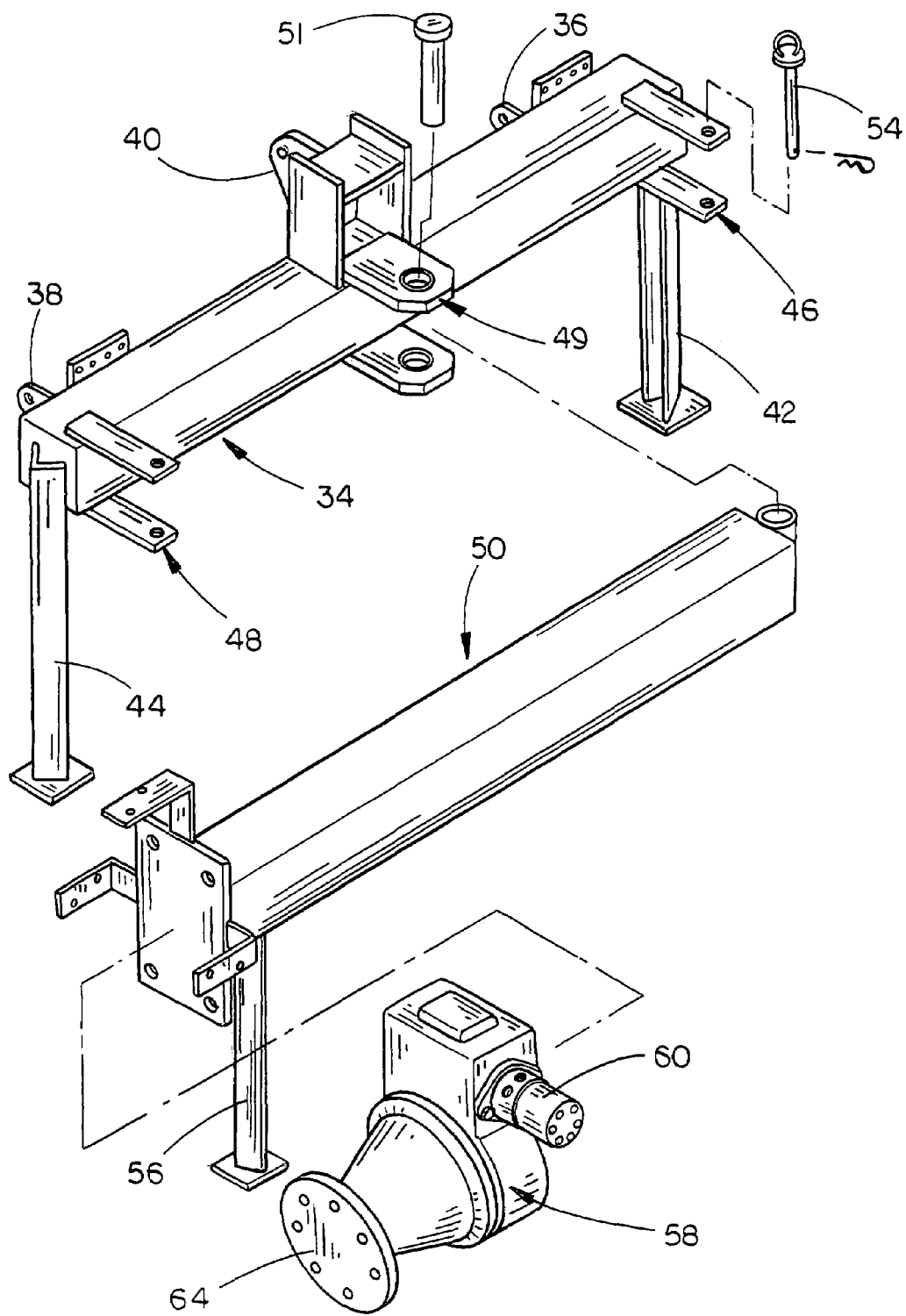
FIG. 4 is an exploded perspective view of the first frame member and the second frame member as well as the gearbox which is attached to the outer end of the second frame member.
Figure 5:
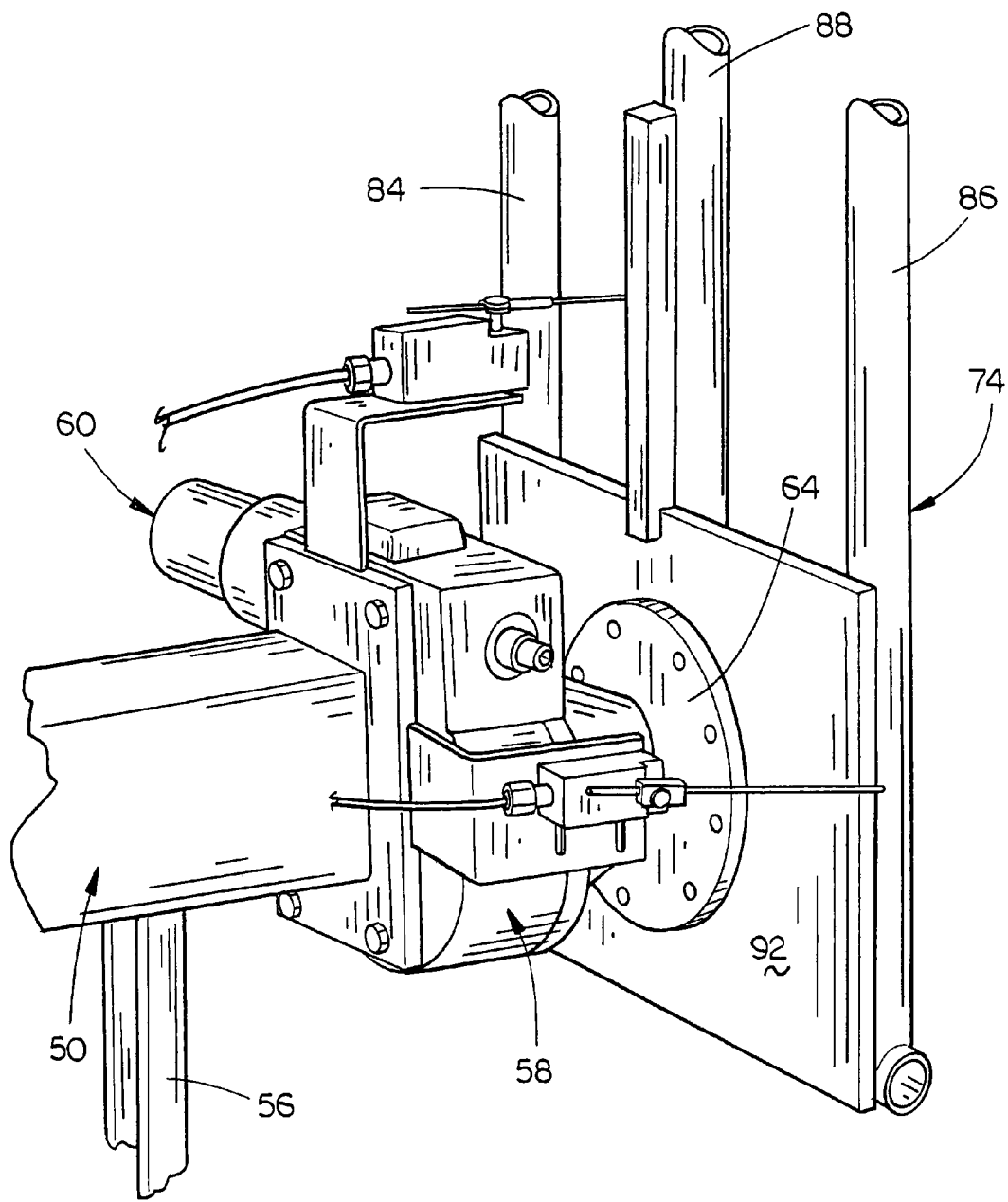
FIG. 5 is a perspective view illustrating the attachment of the gearbox to the gate member.

Assuming that the gate member 74 is in the folded transport position at one side of the tractor, as illustrated by broken lines in FIG. 4, the three-point hitch of the tractor will normally be raised upwardly so that the supports 42, 44 and 56 are not in ground engagement. At this time, rod R will be removed from the clevises 96 and 97 so that outer gate section 78 may be pivotally moved to its extended position. At that time, the rails 102 and 104 of gate section 78 will be received between the clevises 96' and 97' and can be maintained therein by inserting the rod R downwardly through the clevises 96' and 97'. With the gate member 74 in its extended position, the tractor will be driven to a position such as illustrated in FIG. 2 so that the gate member 74 may be used to selectively close the gate opening 124 which is positioned between fences 126 and 128. Prior to any movement of the gate member 74, the three-point hitch of the tractor will be lowered so that the support legs or pipes 42, 44 and 56 are in ground engagement. At that time, the operator will dismount from the vehicle and will operate the transmitter 122 to cause gear motor 60 to rotate the power shaft of gear motor 58 and the plate 64 which will cause the gate member 74 to pivotally move upwardly to a vertical position and then downwardly to the rearwardly extending horizontal position at the right side of the tractor. When the gate member 74 engages limit switch 68, the movement of the gate member 74 will stop which will maintain the gate member 74 in the vertically disposed position as illustrated in FIG. 1. The operator then again operates the transmitter to continue the rotation of the gear motor so that the gate member 74 is lowered to the horizontally and rearwardly extending position. The gate member 74 will continue to be lowered until the gate member 74 engages the limit switch 66 which will deactivate the hydraulic motor 60. When the gate member 74 is in its rearwardly extending horizontal position at the right side of the vehicle, the gate member 74 will close the gate opening 124. With the gate member 74 in its closed position, cattle cannot pass through the gate opening 124.

When it is desired to permit cattle to pass through the gate opening 124, the operator will operate the transmitter 122 to energize the hydraulic motor 60 so that the gate member 74 is raised to the vertically extending position illustrated by broken lines in FIG. 1 which will then permit cattle to pass through the gate opening 124. The gate member 74 is automatically stopped in its vertically disposed position, as illustrated by broken lines in FIG. 1, by the engagement of the gate member 74 with the limit switch 68. When it is desired to again close the gate opening 124, the hydraulic motor 60 is again energized by the operator from a location remote from the gate member 74 so that the gate member 74 is again lowered to the rearwardly extending horizontal position illustrated by solid lines in FIG. 1 and as illustrated in FIG. 1.

The pivotal movement of the frame member 50 with respect to the frame member 34 enables the gate to be positioned at either the right side of the tractor or at the left side of the tractor, as illustrated in FIG. 2. Prior to swinging the frame member 50 with respect to the frame member 34, the three-point hitch of the tractor would be raised to move support 56 out of ground engagement. Once the frame member 50 has been positioned as illustrated by broken lines in FIG. 2, the three-point hitch is again lowered to lower the supports 42, 44 and 56 into ground engagement.

Thus it can be seen that a novel vehicle mounted gate has been provided which enables an operator to remotely control the operation of the gate to selectively open and close gate openings or alleyway openings as required without being required to mount and dismount the tractor.

Thus it can be seen that the invention accomplishes at least all of its stated objectives.

I claim:

1. In combination:
   a vehicle having a forward end, a rearward end, a right side and a left side;
   said vehicle including a hydraulic power means and a multiple-point hitch which is selectively vertically movable at said rearward end thereof;
   a first elongated, transversely extending and horizontally disposed frame member having a first end, a second end, forward and rearward ends;
   said first frame member being secured to said multiple-point hitch for movement therewith;
   a second elongated, horizontally disposed frame member having first and second ends;
   said first end of said second frame member being pivotally secured, about a vertical axis, to said rearward end of said first frame member intermediate the length thereof;
   said second frame member being selectively pivotally movable between first and second positions with respect to said first frame member;
   said second frame member extending from its pivotal connection with said first frame member, when in its said first position, towards and outwardly of said right side of said vehicle and being disposed parallel to said first frame member;
   said second frame member extending from its pivotal connection with said first frame member, when in its said second position, towards and outwardly of said left side of said vehicle and being disposed parallel to said first frame member;
   a gearbox secured to said second end of said second frame member and having a rotatable drive shaft extending horizontally outwardly therefrom;
   a reversible hydraulic motor operatively connected to said vehicle hydraulic power means and to said gearbox for rotating said drive shaft in opposite directions;
   a gate member having first and second ends and first and second sides;
   said drive shaft being operatively secured to said gate member at one side thereof adjacent its said first end;
   said gate member being selectively pivotally movable, with respect to said second frame member, between first, intermediate and second positions;
   said gate member, when in its said first position and said second frame member is in its said first position, extending substantially horizontally and forwardly from said second frame member at said right side of said vehicle;
   said gate member, when in its said intermediate position and said second frame member is in its said first position, extending substantially vertically upwardly from said second frame member;
   said gate member, when in its said second position and said second frame member is in its said first position, extending substantially horizontally and rearwardly from said second frame member at said right side of said vehicle;
   said gate member, when in its said first position and said second frame member is in its said second position, extending substantially horizontally and forwardly from said second frame member at said left side of said vehicle;
   said gate member, when in its said intermediate position and said second frame member is in its said second position, extending substantially vertically upwardly from said second frame member;
   said gate member, when in its said second position and said second frame member is in its said second position, extending substantially horizontally and rearwardly from said second frame member at said left side of said vehicle.

2. The combination of claim 1 wherein said hydraulic motor is remotely controllable.

3. The combination of claim 1 wherein said hydraulic motor is radio remotely controllable.

4. The combination of claim 1 wherein said gate member comprises an inner gate section and an outer gate section pivotally secured thereto.

5. The combination of claim 4 wherein said outer gate section is selectively movable between a working position and a transport position relative to said inner gate section.

6. The combination of claim 1 further including means for selectively maintaining said second frame member in its said first and second positions.

7. The combination of claim 1 further including first, second and third limit switches operatively connected to said electrical power means and said hydraulic motor for stopping the movement of said gate member when it moves to its said first, intermediate and second positions.

8. In combination:
   a vehicle having a forward end, a rearward end, a right side and a left side;
   said vehicle including a hydraulic power means and a multiple-point hitch which is selectively vertically movable at said rearward end thereof;
   a first elongated, transversely extending and horizontally disposed frame means having a first end and a second end;
   said first frame means being secured to said multiple-point hitch for movement therewith;
   a gearbox secured to said first end of said first frame means and having a rotatable drive shaft extending horizontally outwardly therefrom;
   a reversible hydraulic motor operatively connected to said vehicle hydraulic power means and to said gearbox for rotating said drive shaft in opposite directions;
   a gate member having first and second ends and first and second sides;
   said drive shaft being operatively secured to said gate member at one said thereof adjacent its said first end;
   said gate member being selectively pivotally movable, with respect to said frame means, between first, intermediate and second positions;
   said gate member, when in its said first position extending substantially horizontally and forwardly from said frame means at said right side of said vehicle;

said gate member, when in its said intermediate position, extending substantially vertically upwardly from said frame means;

said gate member, when in its said second position, extending substantially horizontally and rearwardly from said frame means at said right side of said vehicle.

9. The combination of claim 8 wherein said hydraulic motor is remotely controllable.

10. The combination of claim 8 wherein said hydraulic motor is radio remotely controllable.

11. The combination of claim 8 wherein said gate member comprises an inner gate section and an outer gate section pivotally secured thereto.

12. The combination of claim 11 wherein said outer gate section is selectively movable between a working position and a transport position relative to said inner gate section.

13. The combination of claim 8 further including first, second and third limit switches operatively connected to said electrical power means and said hydraulic motor for stopping the movement of said gate member when it moves to its said first, intermediate and second positions.

* * * * *